Oct. 17, 1939. W. B. THOMPSON Re. 21,237
APPARATUS FOR LASTING SHOES
Original Filed July 6, 1934 2 Sheets-Sheet 1
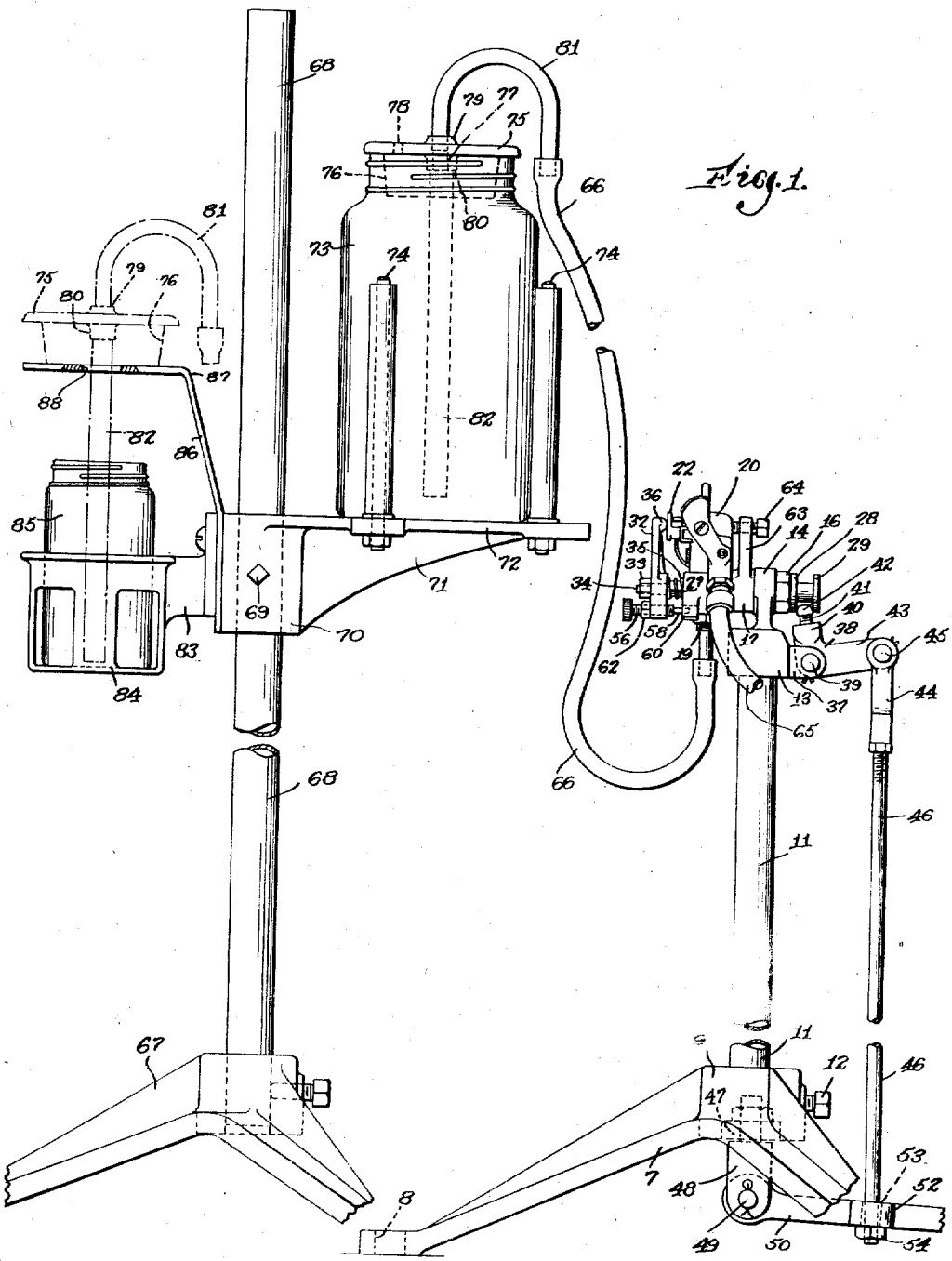
Inventor
Wayne B. Thompson
by Charles W. McDermott
his attorney Oct. 17, 1939. W. B. THOMPSON Re. 21,237
APPARATUS FOR LASTING SHOES
Original Filed July 6, 1934 2 Sheets-Sheet 2
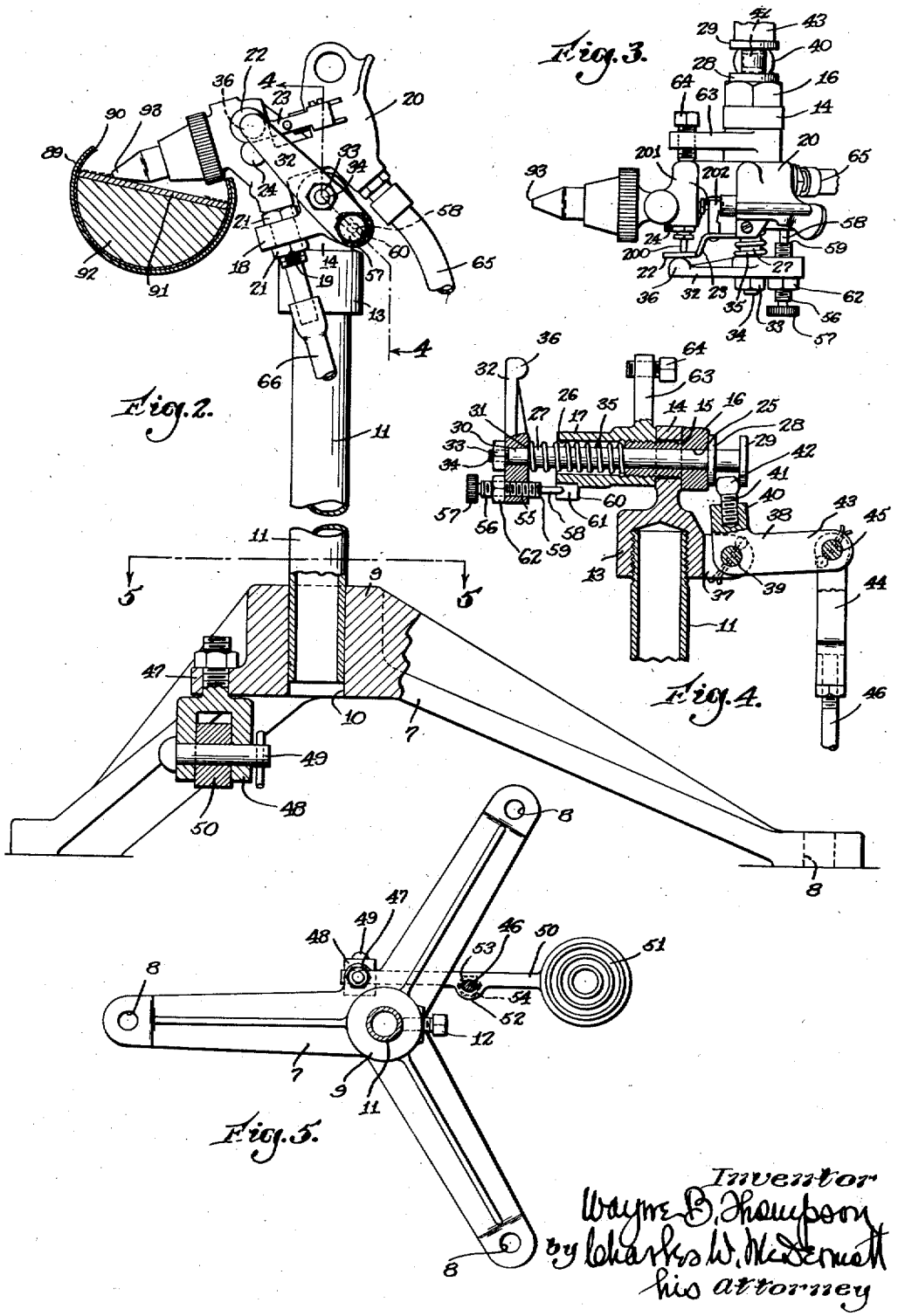
Inventor
Wayne B. Thompson
by Charles W. McDermott
his attorney Reissued Oct. 17, 1939

Re. 21,237

UNITED STATES PATENT OFFICE 21,237

APPARATUS FOR LASTING SHOES

Wayne B. Thompson, Winchester, Mass., assignor to Spray Engineering Company, Somerville, Mass., a corporation of Massachusetts Original No. 2,095,200, dated October 5, 1937, Serial No. 733,973, July 6, 1934. Application for reissue May 10, 1939, Serial No. 272,901

20 Claims. (Cl. 91—45)

The present invention relates to machines which are used in the various processes for the cement lasting of shoes to apply an adhesive to shoe parts in order that they may be secured together in the lasting operation.

In my Patent No. 1,990,803, February 12, 1935, I have disclosed an improvement in the art of lasting shoes in which a modified form of the spray gun disclosed in my Patent No. 1,779,922, October 28, 1930, is utilized to advantage. As disclosed in said Patent No. 1,990,803 the work is stationary and the spray gun is held in the operative's hand so that the discharge nozzle of the spray gun may be transferred along the stationary work. Because of the reverse curves along the edge of the shoe bottom from the breast corner at one side of the shoe around the toe to the breast corner at the other side of the shoe, it is necessary for the operative to twist his wrist considerably during the transfer of the nozzle of the spray gun along or around the shoe bottom. Experience has demonstrated that this mode of operation is tiring.

The principal object of the present invention is to produce an apparatus, for use in practicing the method disclosed in said Patent No. 1,990,803, in which the work is presented by both hands of the operative to relative stationary mechanism for delivering adhesive in the form of spray.

To the accomplishment of this object and such others as may hereinafter appear, the features of the present invention reside in certain devices, combinations, and arrangements of parts hereinafter described and then set forth broadly and in detail in the appended claims, possessing advantages which will be apparent to those skilled in the art.

The various features of the present invention will be readily understood from an inspection of the accompanying drawings, illustrating the best form of the invention at present known to the inventor, in which Figure 1 is a view in elevation with certain parts cut away, showing a rear view of the spray gun mounted for operation and also showing the source of adhesive supply;

Fig. 2 is a view in left side elevation, partially in section, showing the construction of the spider base and showing the spray gun in use for applying adhesive to an insole of a shoe assembled with an upper and a lining on a last;

Fig. 3 is a detail view in plan of the spray gun and of the parts associated immediately therewith;

Fig. 4 is a detail view in sectional elevation taken along the line 4—4 of Fig. 2, the spray gun not being shown; and Fig. 5 is a view in sectional plan taken along the line 5—5 of Fig. 2.

Referring to the drawings, the illustrated embodiment of the present invention is provided with a dished spider base 7 (Figs. 1, 2 and 5) the free ends of the three legs of which are adapted to rest flat on the floor and are provided with screw or bolt apertures 8. The hub 9 of the base is provided with a vertical passage 10 (Fig. 2) in which an upstanding tube 11 is vertically movable. A set screw 12 (Figs. 1 and 5) carried by the hub holds the tube in any desired position of elevation.

Referring to Fig. 4, upon the upper end of the tube 11 there is threaded a cap 13 surmounted by an upstanding lug 14 provided with an unthreaded opening 15. The shank of a stud 16 extends loosely through this opening, with the hexagonal head of the stud abutting one side of the lug 14. Threaded upon the shank of the stud 16 and abutting the opposite side of the lug 14 is a gun support 17. With this construction the position of the gun support 17 may be varied angularly with respect to the cap 13 and yet, by reason of the opening 15 being unthreaded, the support 17 and the head of the stud 16 always abut the lug 14 so that the support is held firmly in place. Projecting forwardly from the support 17 (Fig. 2) is an integral yoke 18 the arms of which (only one arm being shown) receive a thimble 19 threaded into a spray gun 20. Hexagonal locknuts 21, threaded on the thimble, abut the top and bottom, respectively, of the yoke 18 and hold the spray gun in place. It will be seen that the above named elements comprise, in effect, a stand upon which the spray gun 20 is adjustably mounted.

Preferably the spray gun 20 is of the general type disclosed in Patent No. 1,779,922, issued October 28, 1930. More specifically the spray gun is identical with that disclosed in my Patent No. 1,990,803, above referred to, which is a modified form of the gun described and claimed in said Patent No. 1,779,922 and is designed for use in applying an adhesive to shoe parts, thereby supplanting the brush formerly used to apply an adhesive to these parts in lasting operations. The spray gun 20 being identical in construction and mode of operation with that disclosed in my said Patent No. 1,990,803, it need not be described in detail here. It is sufficient to say that the characteristic compressed air and coating material valve spindles 200 and 201, respectively, (Fig.

3), which are arranged in planes normal to each other, are controlled from a thumb piece 22 (Figs. 1, 2 and 3) forming one end of an operating lever 23 at the side of the gun. The thumb piece 22, in addition to being arranged to be engaged and operated by the operative's thumb, is also arranged to abut an adjustable stop 24 threaded into the body of the gun for limiting the movement of the thumb piece. As explained more in detail in my Patent No. 1,779,922, there is a connection 202 between the lever 23 and the adhesive valve spindle 201 so that both the spindles 200 and 201 may be operated by the thumb of the operative's hand in its natural thumb closing movement.

Referring to Fig. 4 again, it will be seen that the stud 16 has a passage 25 and that the support 17 has a passage 26, larger than the passage 25 and aligned with it. These two passages are horizontal, and extending loosely through them is a spindle 27, the right hand end of which, viewing Figs. 1 and 4, is provided with spaced flanges 28 and 29, and the left hand end of which is provided with a reduced portion 30 forming a shoulder 31. Mounted loosely on the reduced portion 30 in engagement with the shoulder 31 is an arm 32 secured on the spindle by a nut 33 threaded to a reduced portion 34 extending from the reduced portion 30. The spindle 27 is maintained normally in the Fig. 4 position, that is, with the flange 28 abutting the head of the stud 16, by means of a spring 35 coiled about the spindle partially within the support passage 26 and interposed between the arm 32 and the end of the shank of the stud 16. The arm 32 has a length such that a boss 36 at one end thereof may be aligned with the thumb piece 22 of the spray gun as shown in Figs. 2 and 3.

In order to move the spindle 27 to the right, viewing Figs. 1 and 4, against the tension of the spring 35, and thus cause the boss 36 on the arm 32 to move the thumb piece 22 to operate the spray gun, the present invention contemplates connecting these elements with operating means which the operative may actuate independently of his hands. In the illustrated embodiment of the present invention the movement of the thumb piece 22 is controlled by the operative's foot.

To this end the cap 13 is provided with a pair of ears 37 (Figs. 1 and 4) between which is pivoted a bell crank lever 38 by means of a pin 39. Threaded into the upper arm 40 of the bell crank lever is a stud 41 provided with a knob 42 having cam surfaces interposed between and engaging the flanges 28 and 29 on the spindle 27. To the other arm 43 of the bell crank lever a clevis 44 is pivoted by means of a pin 45, and depending vertically from the clevis 44 is a link 46. With this construction it will be seen that a downward pull on the link 46 will cause the knob 42 to press against the flange 29 and so cause the spindle 27 and the arm 32 to move to the right, viewing Figs. 1 and 4. The boss 36 on the arm 32 is substantially engaged with the thumb piece 22 when the apparatus is not in operation, as shown in Fig. 1, and as a consequence any movement of the spindle 27 and the arm 32 to the right causes the boss 36 to move the thumb piece 22 and so operate the spray gun.

In order to pull the link 46 downwardly by foot power, the hub 9 of the base is provided at one side with an ear 47, (Figs. 2 and 5), from which depends a clevis 48. Pivoted to the clevis 48 by means of a pin 49 is one end of a lever 50, the opposite end of which is provided with a pedal 51, (Fig. 5). Intermediate its ends the lever 50 is provided with an ear 52 to permit the formation of an opening 53 through which the end of the link 46 loosely passes. A nut 54 on the end of the link serves to hold the pedal 51 elevated from the floor.

The spring 35 is powerful enough to overcome the weight of the pedal lever 50, the link 46, the bell crank lever 38 and the spindle 27 when no pressure is applied to the pedal 51 by the operative. Stated in another way the spray gun 20 is held out of operation and the pedal 51 is held normally raised by the spring 35, and when the operative releases his foot from the pedal after having pressed it down to move the spindle 27 to the right to operate the gun, the spring 35 draws the spindle to the left and raises the pedal 51 to throw the gun out of operation.

As is well understood by those skilled in the art, in the use of spray guns employing a motive agent, the speed and amount of application of the coating material to the surface to be coated may be varied by the amount of opening movement of the motive agent and coating material valves within the gun. In the type of gun disclosed in Patent No. 1,779,922 and in the modification thereof disclosed in my Patent No. 1,990,803 referred to above, the amount of opening movement of the valves may be limited by a stop 24 (Fig. 2) which limits the amount of movement of the thumb piece 22. So long as the gun is held in the operative's hand, this type of stop is very effective because there is no strain on the gun when the thumb piece strikes the stop. In mounting the gun so that it may be operated by foot power, however, this type of stop is not desirable for the reason that foot movement is coarse as compared to the delicacy of movement of the thumb, and foot pressure is very great as compared to that offered by the thumb, and further, as compared to the minimum necessary to move the thumb piece. It is obvious, therefore, that the stop which limits the movements of the thumb piece 22 should not be on the gun, but should be elsewhere so that there is no strain on the gun when the pedal 51 is depressed.

To achieve this result the stop 24 is threaded into the gun as far as it will go so that the thumb piece 22 cannot strike it. The stop 24 is shown in this position in Fig. 4. As a substitute for the stop 24 the end of the arm 32 opposite the boss 36 is provided with an opening 55 (Fig. 4) through which is threaded a stud 56 provided with a knurled head 57. The threaded end of the stud 56 is reduced to form a pin 58 and a shoulder 59. Depending outwardly and rearwardly from the support 17 is an integral stop 60 (Figs. 1 and 4) provided with a narrow channel 61 which receives the pin 58. The stop 60 is aligned with the stud 56 so that when the arm 32 moves to the right, viewing Figs. 1 and 4, the shoulder 59 on the stud strikes the stop and thus limits the movement of the arm and therefore the movement of the boss 36 and the thumb piece 22. The stud 56 being threaded in the arm 32, it may be adjusted to vary the amount of movement of the spindle 27, and the stud is held in any desired adjustment by a lock nut 62. With this construction the force applied to the pedal 51 in excess of that necessary to move the thumb piece 22 is directed against the stop 60, and as this stop is an integral part of the support 17, none of this excess force is directed against the gun itself to subject it to strain as it is supported on the yoke 18 (Fig. 2).

It will be observed that the pin 58 and the channel 61 play no part in the functioning of the stop 60. These elements function to maintain the boss 36 on the arm aligned with the thumb piece 22. As stated above, the arm 32 is held on the spindle 27 by the nut 33, the spindle 27 is not threaded to the stud 16, and the support 17 is threaded only to the stud 16 and not to the lug 14 on the cap 13. While this construction provides a convenient means of adjusting the angle of the spray gun 20, it will be seen that if the position of the support 17 is shifted slightly with respect to the cap 13, the arm 32 will not necessarily move with the support and the boss 36 may no longer be in alignment with the thumb piece 22. This result is prevented by the pin 58 and the channel 61 because any movement of the support 17 relatively to the cap, as when the angle of the gun is being changed, is transferred through the pin 58 to the arm 32.

To prevent any twisting of the spray gun 20 as the result of moving the arm 32 to operate it, the support 17 is provided with a thrust bearing comprising an arm 63 (Figs. 1, 3 and 4) upstanding integrally from the support and carrying a stud 64 threaded into engagement with the gun.

In the operation of the spray gun, motive agent under pressure is admited to the gun through a hose connection 65 extending from a source of supply (not shown) as is well understood. A liquid adhesive is admitted to the gun through a hose connection 66 one end of which is mounted on a nipple extending from the thimble 19 secured to the gun. It will be apparent that the adhesive may be kept in any source of supply convenient for use with the present apparatus. It is preferred, however, to utilize the apparatus shown in Fig. 1, for reasons which will presently appear.

This apparatus comprises a spider base 67 and a tube 68 vertically movable thereon, constructed in a manner like that of the base 7 and the tube 11. Mounted for vertical movement on the tube 68, and provided with a set screw 69, is a hub 70 from which extends an integral arm 71 provided with a table 72 which supports a jar 73 containing the adhesive. To maintain the jar in position, the table is provided with three or more posts 74 (only two being shown) which may be provided with rubber covers substantially engaging the jar. Adapted to rest on the mouth of the jar is a cover 75 provided with a depending flange 76 adapted to fit loosely within the mouth of the jar. The cover is also provided with a central opening 77, a vent 78, and upper and lower bosses 79 and 80, respectively, through which the opening 77 is formed. One end of a gooseneck 81 is mounted in the boss 79 and the other end of the gooseneck receives the end of the hose connection 66. Depending from the lower boss 80 into the jar 73 is a tube 82. With this construction, the flange 76 serves to steady the cover 75 on the mouth of the jar and to guide and hold the tube 73 in proper position within the jar.

The adhesive contained in the jar 73 is preferably latex, and it is well known that latex coagulates readily upon exposure to the air. As the cap 75 and the tube 82 must be removed from the jar 73 when it is to be refilled, it is apparent that the latex may coagulate in a film on the interior of the tube so that when the tube is replaced in the jar 73 the film may be peeled off and drawn into the spray gun and upon the work in the form of pills.

To prevent this, the hub 70 is provided with an arm 83 on which is formed a cup 84 for holding a jar 85 of water. A bracket 86, interposed between the hub 70 and the arm 83, projects upwardly and is provided with a horizontal arm 87 positioned over the jar 85. The arm 87 serves as a support for the cover 75 (indicated in construction lines) when it is removed from the jar 73 and is provided with a central opening 88 so that the tube 82 may extend into the water in the jar 85. In this manner the latex in the tube 82 is not exposed to the air while the jar 73 is being refilled, and there is no opportunity for the latex in the tube to coagulate and so clog the gun or possibly injure the work. It is appreciated that the latex in the tube 82 is exposed to the air while the tube is being transferred from the jar 73 to the jar 85 and back again. Experience has demonstrated, however, that this time interval is too short for the air to affect the latex in the tube.

In operating the illustrated embodiment of the present invention the operative stands in the space at the back of the apparatus (Fig. 1). In this space the operative is out of the zone of the spray delivered to the work, that is, the spray is delivered away from the operative. The stand for the gun is constructed to provide spaces at opposite sides of the spray gun out of the zone of spray so that the operative may extend his arms forwardly and hold the work in both hands to present the work in position to receive the spray delivered by the spray gun. The stand is sufficiently low to allow the operative to look over the spray gun downwardly upon the work. If the operative stands at the apparatus he operates the pedal 51 with the sole of his foot. If he is seated at the apparatus the pedal is operated with his heel. The set screw 12 permits the operative to adjust the height of the spray gun to suit his convenience, and to the same end the manner of mounting the support 17 on the cap 13 permits the adjustment of the spray gun angularly relatively to the cap 13.

In my said Patent No. 1,990,803 above referred to, I have described the use of the spray gun 20 in lasting operations where the gun is held in the operative's hand and the thumb piece 22 is operated by his thumb. When the gun is so held, the work being mounted upon a support, the operative slides the nozzle of the gun over or along the portions of the work to be coated. With the present invention, however, the gun is not moved at all, and the operative holds the work in his hands and moves it bodily with respect to the gun to transfer the portions to be coated into the path of discharge of the nozzle. The result achieved with the present invention is the same as that where the gun is hung on the hand, so far as mere discharge of the coating material upon a surface is concerned, but the result is achieved in a much more efficient and speedy manner, and the spray is at all times discharged directly away from the operative.

As stated in my said Patent No. 1,990,803 the conical nozzle of the spray gun 20 is shaped as it is so that the discharge orifice may be placed very near the work and so that if the marginal portions of the upper and its lining are not secured together before being assembled on a last, the nozzle may be inserted between the adjacent faces of these marginal portions to separate them. When the gun is hung on the hand there is no means of aiding the insertion of the nozzle between the marginal portions, with the result that if the upper and its lining tend to cling together, some difficulty is experienced in separating them by means of the nozzle alone. With the present invention, however, the operative has both hands free to hold and manipulate the work, and as a consequence he may separate the marginal portions of the upper and its lining manually so that the discharge nozzle may be inserted between them with ease and in a minimum time.

To cause the discharge coating to be applied around or along the separated faces, the operative uses both his hands to move the work in the path of discharge of the nozzle, turning the work when necessary and easily holding it so positioned with respect to the nozzle so that the separated faces are provided with a uniform coating as desired. The coated faces of the marginal portions of the upper and its lining may be pressed together by the operative's hands after the coating operation has been completed and the separated faces withdrawn from the nozzle, or the operative may engage the insole with the nozzle and then slide the margin of the work towards the nozzle so that its discharge end is interposed between the marginal portions of the lining and the insole. In this position the coated face of the lining may be wiped into adherence with the adjacent coated face of the upper by drawing the work along the discharge nozzle, at the same time exerting a slight downward pressure to press the lining against the upper as they move over the stationary nozzle. By the same mode of operation, the work may be moved and turned relatively to the discharge nozzle to effect the application of coating to the exposed face of the marginal portion of the lining and to the marginal portion of the insole, after which the unit comprising the upper adhesively united to the lining may be overdrawn upon the marginal portion of the insole and secured thereto by the previously applied adhesive in any suitable one of the well known machines.

Since the operative, by using both hands to hold and move the work relatively to the stationary spray gun achieves the same coating effect as when he manually moves the spray gun relatively to work mounted upon a support, it is not deemed necessary to describe in further detail here the position of the coating on the various shoe parts. This is fully described in my said Patent No. 1,990,803. However, in Fig. 2 I have shown an upper 89 secured to its lining 90 and assembled with an insole 91 upon a last 92. The work is held against the nozzle as shown so that it lies substantially flat on the insole with its discharge end 93 located at a point spaced from the vertex of the angle formed by the unit upper and the adjacent face of the insole a distance substantially commensurate with the width of the upstanding lining face of the unit upper. Holding the insole engaged with the nozzle in this position, the operative depresses the pedal 51 and then slides the insole along the nozzle to transfer the portions to be coated into the path of discharge, thereby producing upon them a stripe of adhesive uniform in thickness and substantially uniform in width.

Nothing herein explained is to be interpreted as limiting the various features of the present invention in the scope of its application to use in connection with the particular apparatus or the particular mode of operation, or both, selected for the purposes of illustration and disclosure. While the particulars of construction herein set forth are well suited to one mechanical form of the invention and to the uses to which it is put, it is not limited to these uses, nor to these particulars of construction, nor to the conjoint use of all its features, nor is it to be understood that these particulars are essential since they may be modified or varied within the skill of the artisan without departing from the true scope of the actual invention, characterizing features of which are set forth in the following claims by the intentional use of generic terms and expressions inclusive of various modifications.

What is claimed as new, is:

1. In an apparatus for applying coating, the combination with a support, a spray gun, means for securing the spray gun to the support, and movable means controlled by the operative for operating the gun, of an abutment for the gun to prevent bodily movement thereof on the support upon movement of the gun operating means.

2. In an apparatus for applying coating, the combination with a spray gun provided with an operating lever, a support on which the gun is mounted, an arm bodily movable toward and away from the support and provided with a portion alignable with the operating lever for moving it to throw the gun into operation upon movement of the arm, and means for moving the arm, of means for maintaining the alignment of the arm portion and the operating lever.

3. In an apparatus for applying coating, the combination with a spray gun, a support on which the gun is mounted, a spindle movable on the support, an arm carried by the spindle and movable therewith to throw the spray gun into operation, and means for moving the spindle, of means carried by the arm and engageable with the support for limiting the movement of the spindle.

4. In an apparatus for applying coating, the combination with a spray gun provided with an operating lever, and a support on which the gun is mounted, of means controlled by the operative's foot for operating the gun, said means comprising a spindle movable on the support, an arm carried by the spindle and movable therewith for moving the operating lever, a pedal, and means for operatively connecting the pedal with the spindle to cause it to respond to movement of the pedal.

5. In an apparatus for applying coating, the combination with a support, a spray gun, provided with an operating lever, mounted on the support for angular adjustment thereon, an arm movable relatively to the support and provided with a portion alignable with the operating lever regardless of the angular adjustment of the gun for moving the operating lever to throw the gun into operation, and means for moving the arm to cause it to move the operating lever, of means carried by the arm and cooperating with the support for maintaining the alignment of the arm portion with the operating lever in any angular adjustment of the gun.

6. In an apparatus for applying coating, the combination with a spray gun, a support on which the gun is mounted, a spindle movable on the support, and an arm carried by the spindle movable therewith to throw the gun into operation, of means controlled by the operative's foot for moving the spindle.

7. In an apparatus for applying coating, the combination with a spray gun, a support on which the gun is mounted, a spindle movable on the support, an arm carried by the spindle and movable therewith to throw the gun into operation, a pedal, and means for operatively connecting the pedal with the spindle to cause it to respond to movement of the pedal, of means adjustably secured to the arm and cooperating with the support for limiting the movement of the spindle.

8. In an apparatus for applying coating, the combination with a spray gun, a support on which the gun is mounted for angular adjustment, a spindle movable on the support, an arm movable on the spindle and movable bodily therewith to throw the gun into operation, a pedal, and means for operatively connecting the pedal with the spindle to cause it to respond to movement of the pedal, of means carried by the arm cooperating with the support for maintaining the arm in position to throw the gun into operation regardless of the angular adjustment of the gun.

9. In an apparatus for applying coating, the combination with a spray gun, a support on which the gun is mounted for angular adjustment, a spindle movable on the support, an arm movable on the spindle and movable bodily therewith to throw the gun into operation, a pedal, and means for operatively connecting the pedal with the spindle to cause it to respond to movement of the pedal, of means carried by the arm cooperating with the support for limiting the movement of the spindle and for maintaining the arm in position to throw the gun into operation regardless of the angular adjustment of the gun.

10. In an apparatus for applying coating, the combination with a support, a spray gun, provided with an operating lever, mounted on the support for angular adjustment rotatively about a horizontal axis, a member carried by the support and movable along said horizontal axis, an arm carried by said member and provided with a portion alignable with said operating lever for moving said lever to throw the gun into operation, and means for moving the member to cause the arm to actuate the operating lever, of means carried by the arm and cooperating with the support for maintaining the alignment of the arm portion with the operating lever in any angular adjustment of the gun about the horizontal axis.

11. In an apparatus for applying coating, the combination with a spray gun, a support therefor, a spindle longitudinally movable on the support, said spray gun being mounted on the support for angular adjustment rotatively about the spindle, an arm movable on the spindle and movable bodily therewith during its longitudinal movement to throw the gun into operation, a pedal, and means for operatively connecting the pedal with the spindle to cause it to move longitudinally in response to movement of the pedal, of means carried by the arm cooperating with the support for maintaining the arm in position to throw the gun into operation regardless of the angular adjustment of the gun.

12. In an apparatus for applying coating, the combination with a spray gun, a support therefor, a spindle longitudinally movable on the support, said spray gun being mounted on the support for angular adjustment rotatively about the spindle, an arm movable on the spindle and movable bodily therewith during its longitudinal movement to throw the gun into operation, a pedal, and means for operatively connecting the pedal with the spindle to cause it to move longitudinally in response to movement of the pedal, of means carried by the arm cooperating with the support for limiting the longitudinal movement of the spindle and for maintaining the arm in position to throw the gun into operation regardless of the angular adjustment of the gun.

13. In an apparatus for applying coating, the combination with a spray gun, a support on which the gun is mounted for angular adjustment about an axis, a spindle movable on the support substantially along said axis, an arm operatively connected to the spindle so as to be moved by it to throw the gun into operation, and means for maintaining the arm in position to throw the gun into operation regardless of the adjusted position of the gun about said axis, of means controlled by the operative's foot for moving the spindle to effect said arm movement.

14. In an apparatus for applying coating, the combination with a spray gun, a support on which the gun is mounted for angular adjustment about an axis, a spindle longitudinally movable on the support substantially along said axis, an arm operatively connected to the spindle so as to be moved by it to throw the gun into operation, and means for maintaining the arm in position to throw the gun into operation regardless of the adjusted position of the gun about said axis, of means including a foot pedal and link means for moving the spindle to effect said arm movement.

15. In an apparatus for applying coating, the combination with a spray gun, a support on which the gun is mounted for angular adjustment about an axis, said support being provided with a passage having an axis substantially identical with the first named axis, a spindle movable in the passage substantially along the axis thereof, an arm operatively connected to the spindle so as to be moved by it to throw the gun into operation, and means for maintaining the arm in position to throw the gun into operation regardless of the adjusted position of the gun about its said axis, of means controlled by the operative's foot for moving the spindle to effect said arm movement.

16. In an apparatus for applying coating, the combination with a spray gun provided with an operating lever, and a support on which the gun is mounted for angular adjustment about an axis, of means controlled by the operative's foot for operating the gun, said means comprising a spindle movable on the support substantially along said axis, an arm operatively connected to the spindle and responsive to movement thereof for moving the operating lever to actuate the gun, means for maintaining the arm in position to move the operating lever to actuate the gun regardless of the adjusted position of the gun about said axis, a pedal, and means operatively connecting the pedal with the spindle to cause it to respond to the movement of the pedal to effect said arm movement.

17. In an apparatus for applying coating, the combination with a spray gun provided with an operating lever, and a support on which the gun is mounted for angular adjustment about an axis, said support being provided with a passage having an axis substantially identical with the first named axis, of means controlled by the operative's foot for operating the gun, said means comprising a spindle movable in the support passage substantially along the axis thereof, an arm operatively connected to the spindle and responsive to movement thereof for moving the operating lever to actuate the gun, means for maintaining the arm in position to move the operating lever to actuate the gun regardless of the adjusted position of the gun about its said axis, a pedal, and means operatively connecting the pedal with the spindle to cause it to respond to movement of the pedal to effect said arm movement.

18. An apparatus for applying coating having, in combination, a spray gun, a support on which the gun is mounted for angular adjustment about an axis, and means controlled by the operative's foot for operating the gun, said gun operating means comprising a movable spindle, an arm operatively connected to the spindle so as to be moved by it to throw the gun into operation, means for maintaining the arm in position to throw the gun into operation regardless of the adjusted position of the gun about said axis, a pedal, and link means operatively connecting the pedal with the spindle to cause it to respond to movement of the pedal to effect said arm movement, the spindle and the link means being movable independently of any adjusted position of the gun about said axis so that said spindle and link means are in the same position relatively to each other when the gun is in one adjusted position about said axis that they are in when the gun is in any other adjusted position about said axis.

19. An apparatus for applying coating having, in combination, a spray gun, a support on which the gun is mounted for angular adjustment about an axis, a movable spindle, an arm operatively connected to the spindle so as to be moved by it to operate the gun, means for maintaining the arm in position to operate the gun regardless of the adjusted position of the gun about said axis, and means, including a rod operatively connected to the spindle, controlled by the operative's foot for moving the spindle to effect said arm movement, the spindle and the spindle moving means including the rod being movable independently of any adjusted position of the gun about said axis so that said spindle and spindle moving means including the rod are in the same position relatively to each other when the gun is in one adjusted position about said axis that they are in when the gun is in any other adjusted position about said axis.

20. An apparatus for applying coating having, in combination, a spray gun, a support on which the gun is mounted for angular adjustment about an axis, said support being provided with a passage, and means controlled by the operative's foot for operating the gun, said gun operating means comprising a spindle movable in said support passage, an arm operatively connected to the spindle so as to be moved by it to throw the gun into operation, means for maintaining the arm in position to throw the gun into operation regardless of the adjusted position of the gun about said axis, a pedal, and link means operatively connecting the pedal with the spindle to cause it to respond to movement of the pedal to effect said arm movement, the spindle and the link means being movable independently of any adjusted position of the gun about said axis so that said spindle and link means are in the same position relatively to each other when the gun is in one adjusted position about said axis that they are in when the gun is in any other adjusted position about said axis.

WAYNE B. THOMPSON.